Nov. 11, 1952   H. E. VAN VALKENBURG   2,617,854
INDUCED VOLTAGE FLAW DETECTOR
Filed Aug. 13, 1949
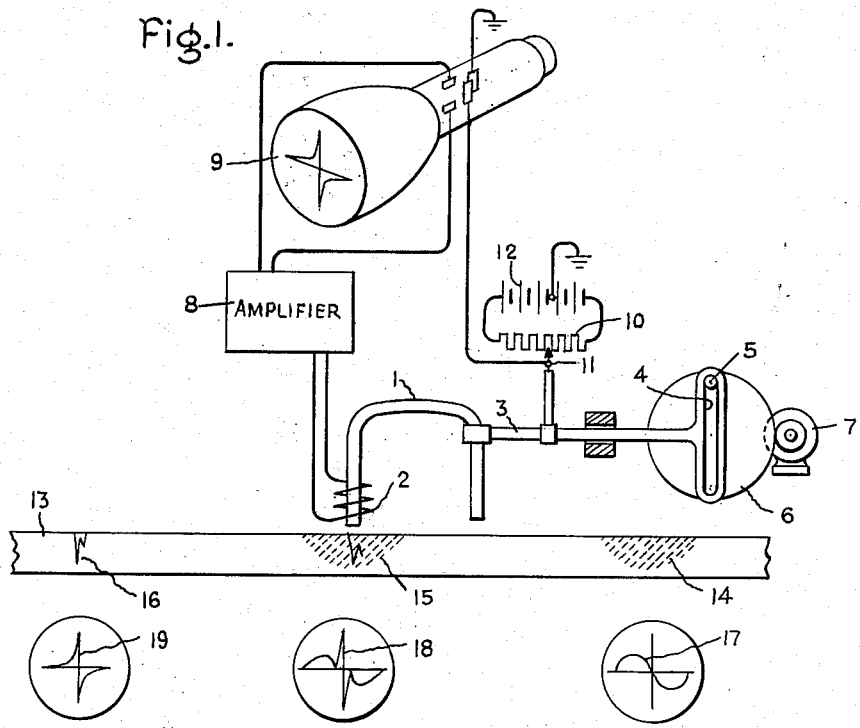
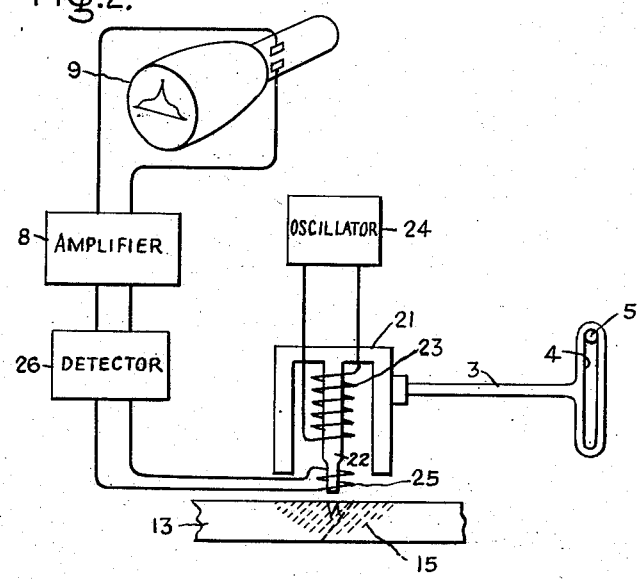
Inventor:
Howard E. Van Valkenburg,
by Paul A. Frank
His Attorney.

Patented Nov. 11, 1952

2,617,854

UNITED STATES PATENT OFFICE 2,617,854

INDUCED VOLTAGE FLAW DETECTOR

Howard E. Van Valkenburg, Schenectady, N. Y., assignor to General Electric Company, a corporation of New York Application August 13, 1949, Serial No. 110,117

3 Claims. (Cl. 175—183)

The present invention relates to the testing of magnetic materials to determine variations in grain structure and internal defects in the material.

It is an object of my invention to provide a new and simple apparatus for locating defects in magnetic materials which occur at or near the surface.

A further object of my invention is to provide an apparatus suitable for production line use in detecting flaws and cracks resulting from heat stresses in the welding of sheet steel.

Besides the destructive methods of testing materials which have obvious disadvantages, there are, at the present time, several known practical non-destructive thesting methods. One method, which I shall term the magnetic particle method, comprises scattering iron powder or filings on the surface of magnetic material to be tested. The material is located in a magnetic field of constant intensity, and the iron particles adhere to the surface of the material and give a rough indication of the magnetic density throughout it. Variations in density are interpreted to indicate any defects. This method is obviously unsuited to production line inspection, since it is slow and time consuming and requires skilled operators to interpret the results. Well-known X-ray methods are useful mostly for locating blow-holes and defects having considerable volume in large castings and are not suitable for locating thin cracks in sheet steel.

Another method, which I shall term the magnetic method, involves measuring the intensity of a magnetic field near a discontinuity, when the object being tested is placed in a field of constant intensity. A variety of instruments have been used in the past for such applications but each suffers from the same limitation. The reading obtained depends upon the permeability of a large bulk of material, so that small discontinuities in the presence of large changes in structure cannot be detected. Thus in the case of welded sheet steel, I have found greater changes in bulk permeability among a group of good welded samples than between a poor and a sound weld.

My invention takes advantage of the desirable properties of the magnetic method and overcomes its limitations by utilizing a dynamic rather than a static measurement of the magnetic field in the area to be tested. In accordance wtih my invention, a moving magnetic field is set up by a small probe magnet which is either rotated or vibrated longitudinally along the surface of the material being tested. A small pick-up coil is attached to the vibrating magnet, and variations in the reluctance of the magnetic path in the material being tested cause an electrical signal to be induced in the coil. This electrical signal is then amplified and supplied to the vertical deflection plates of a cathode ray tube. Means are also provided for causing the electron beam in the cathode ray tube to be deflected horizontally in synchronism with the vibration of the magnet, so that the luminous trace on the face of the tube indicates the variation in magnetic intensity at the surface of the material over which the magnet is vibrating.

For further objects and advantages and for a better understanding of the invention, attention is now directed to the following description and accompanying drawings. The features of my invention believed to be novel will be more particularly pointed out in the appended claims.

In the drawings:

Fig. 1 is a simplified schematic diagram of an induced voltage flaw detecting apparatus embodying my invention, along with certain typical illustrative examples of commonly encountered flaws.

Fig. 2 illustrates a variation in the apparatus of Fig. 1.

Referring to Fig. 1, there is shown a permanent magnet of the horseshoe type 1, about one leg of which a coil 2 has been wound to constitute a pick-up coil. Magnet 1 is fastened to a longitudinally extended member 3, of which one end is transversely extended and formed to provide a vertical slot 4, the whole constituting what is commonly known as a Scotch yoke. Associated with vertical slot 4 is a pin 5 which is mounted on a disk 6 driven by means of a motor 7. The rotary motion of the disk imparts an oscillatory reciprocating motion to the magnet 1, in a plane parallel to the surface of the material tested at a sinusoidal velocity controlled by the motor 7.

The terminals of coil 2 are connected to an amplifier 8 whose output circuit is connected to the vertical deflection plates of a cathode ray tube 9. Amplifier 8 may be of the type commonly known as a direct current amplifier which amplifies signals of any frequency down to zero frequency, or it may be simply an ordinary amplifier having an extended low frequency response.

A potentiometer 10 has an adjustable tap 11 which is mechanically linked with the member 3, so that it is driven in synchronism with magnet 1. Tap 11 is connected to one of the horizontal deflection plates of cathode ray tube 9. A battery 12 is connected across the end terminals of potentiometer 10 and has its central point grounded. Accordingly, the electron beam in cathode ray tube 9 produces a trace across the end wall of the tube which corresponds to the displacement, at any instant, of the magnet 1.

In operation, the sample of magnetic material to be tested may be moved continuously at a relatively slow rate beneath the magnet 1 which oscillates at a relatively high rate. A cross-sectional view of a sample 13 of such a continuous strip has been shown and illustrates a good weld area 14, a weld area 15 containing a crack, and also a crack 16 occurring in an otherwise uniform area. As the pole of magnet 1 which support the pick-up coil 2 vibrates over the material, the changes in flux through the coil induce a voltage therein whenever a discontinuity is encountered in the permeability of the material 13. Thus the weld area 14 produces a gradual change in the magnetic flux through the pick-up coil and causes a voltage to be generated therein which produces a trace 17 on the face of the cathode ray tube.

It will be observed that the actual voltage generated in the pick-up coil is proportional to the rate of change of flux through the coil, and accordingly the trace produced on the cathode ray tube corresponds to the derivative of the permeability function. Thus, the weld area 14 produces a more or less sinusoidal wave 17, whereas the weld area 15 containing a crack produces a sinusoidal trace 18 on which a sharp double spike has been superimposed. In the same fashion, the crack 16 produces a trace 19 containing a double spike which is proportional to the rate of change of flux through the pick-up coil 2 as it passes over the crack.

The fact that the trace obtained on the face of the cathode ray tube represents the rate of change of magnetic flux through the coil, rather than the flux itself, is of small consequence. In practice, the presence of a crack can be indicated as well by a trace having a double spike as by a trace containing only a single spike corresponding to the crack. However, it is possible to provide a pattern which is proportional to the actual magnetic permeability rather than to its rate of change. This is achieved by substituting a high frequency alternating magnetic field for the permanent magnet 1, and causing it to oscillate in the same fashion. Such an arrangement is illustrated in Fig. 2, wherein the same numerals have been used to indicate corresponding parts as in Fig. 1.

In the modified arrangement of Fig. 2, a laminated core 21 has been substituted for the permanent magnet shown in Fig. 1. Core 21 is cylindrical in shape and has an internal leg 22 which projects lower than the outer cylindrical casing of the core. A winding 23 about the upper part of leg 22 is provided with high frequency current by an oscillator 24. The lower end of leg 22 has a smaller cross section than the remainder thereof, and wound about it is a pick-up coil 25 which is connected to a detector 26. Detector 26 in turn is connected to amplifier 8, and the remainder of the apparatus is identical to that shown in Fig. 1.

In the modified arrangement of Fig. 2, the high frequency currents induced in the pick-up coil 25 are proportional in magnitude to the permeability of the section of the material being tested, over which the tip of the central leg 22 of core 21 is passing at any instant. These oscillations are rectified in detector 26 to recover the amplitude or envelope thereof, and this envelope is amplified through amplifier 8 and appears as a luminous trace on the face of the cathode ray tube 9. The resulting trace on the cathode ray tube is illustrated by curve 27 and shows a gentle curve, corresponding to the welded area, on which a sharp spike is superimposed, corresponding to the crack therein. This arrangement provides a more readily interpreted indication on the cathode ray tube, but has the disadvantage of greater complexity.

While certain specific embodiments have been shown and described, it will, of course, be understood that various modifications may be made without departing from the invention. The appended claims are, accordingly, intended to cover any such modifications within the true spirit and scope of the invention.

What I claim as new and desire to secure by Letters Patent of the United States is:

1. An induced voltage flaw detector for locating flaws near the surface of a material being tested by measuring changes in the permeability thereof, comprising a magnet having a pole located in proximity to the surface of said material, a pick-up coil wound about said magnet in proximity to said pole, a mechanical vibration system for imparting an oscillatory motion to said magnet in a plane parallel to the surface of said material, a potentiometer having a sliding tap mechanically linked to said vibration system, a cathode ray tube, a connection from said tap to said cathode ray tube for causing the electron beam thereof to be deflected in synchronism with the oscillations of said magnet, an amplifier connected to said pick-up coil for amplifying voltages induced therein, said amplifier being connected to said cathode ray tube for supplying said voltages thereto for deflecting said electron beam.

2. An induced voltage flaw detector comprising a core structure having a pole piece for producing a concentrated magnetic field, means for inducing high frequency magnetic alternations in said core, mechanical means for imparting an oscillatory motion to said core in a plane parallel to the surface of a material being tested, a pick-up coil located on said core in proximity to said pole piece, means coupled to said core oscillating means for developing a varying signal that varies in synchronism with the oscillation of said core, and a cathode ray tube having a first electron beam deflection structure and a second electron beam deflection structure for controlling the electron beam thereof, said pick-up coil being operatively coupled to said first deflection structure and said varying signal developing means being operatively coupled to said second deflection structure.

3. An induced voltage flaw detector for locating flaws near the surface of a material being tested by measuring changes in the permeability thereof, comprising a core structure having a pole for producing a concentrated magnetic field, means for inducing high frequency magnetic alternations in said core, a pick-up coil wound about said pole, a mechanical vibration system for imparting an oscillatory motion to said core in a plane parallel to the surface of said material, a potentiometer having a sliding tap mechanically linked to said vibration system, a cathode ray tube, a connection from said tap to said cathode ray tube for causing the electron beam thereof to be deflected in synchronism with the oscillations of said core, a detector and an amplifier connected to said pick-up coil for amplifying voltages induced therein, said amplifier being connected to said cathode ray tube for supplying said voltages thereto for deflecting said electron beam.

HOWARD E. VAN VALKENBURG.

REFERENCES CITED

The following references are of record in the file of this patent:

UNITED STATES PATENTS

| Number | Name | Date |
| --- | --- | --- |
| 2,077,380 | Drake | Apr. 20, 1937 |
| 2,179,240 | Breitenstein | Nov. 7, 1939 |
| 2,207,592 | Lenk | July 9, 1940 |
| 2,388,683 | Frickey et al. | Nov. 13, 1945 |
| 2,519,367 | Gunn et al. | Aug. 22, 1950 |
| 2,527,170 | Williams | Oct. 24, 1950 |

OTHER REFERENCES

Journal of Applied Physics, vol. 13, June 1942, pages 377–383, article by Vigness et al.